A. G. CUMMINGS.
CLOTHES-PINS.

No. 184,846.

Patented Nov. 28, 1876.

Witnesses.
George B. Dunbar
Albert Post Jr

Inventor:
Albert G. Cummings

UNITED STATES PATENT OFFICE.

ALBERT G. CUMMINGS, OF CHICAGO, ILLINOIS, ASSIGNOR OF ONE-HALF HIS RIGHT TO JONATHAN R. TALCOTT, OF NORTH WILLISTON, VERMONT.

IMPROVEMENT IN CLOTHES-PINS.

Specification forming part of Letters Patent No. 184,846, dated November 28, 1876; application filed April 20, 1876.

*To all whom it may concern:*

Be it known that I, ALBERT G. CUMMINGS, of Chicago, in the county of Cook and State of Illinois, have invented a new and useful Improvement in Clothes-Pins; and I do hereby declare the following to be a full, clear, and exact description thereof, reference being made to the accompanying drawing, forming a part of this specification, and in which—

Figure 1:
Figure 2:
Figure 3:

Figure 1 is a front view. Fig. 2 is a side view. Fig. 3 is a transverse sectional view.

This invention consists of a clothes-pin provided with a series of notches for the reception of different size clothes-lines, as hereinafter more fully described.

The clothes-pin A has two parallel sides, with rounded or beveled corners at the lower extremities, as shown at $a\ a$, Figs. 1 and 3. The two sides are formed of large and small concave segments, with a short portion of full width, with upper corners rounded, as shown in Fig. 2, which also shows lower extremities rounded or beveled, as usual, for a short distance upward, to the notches formed by the sharp and blunt angles $b\ b$ and $c\ c$. As the space inward becomes narrower, the angles $c\ c$ are shortened until terminated by the slot $d$, which continues upward for three-fourths the length of pin.

The object of the sharp angle $b$ is to retain the pin and the clothes upon the line, by giving increased tension on its face at that point, while the blunt angle $c$ increases the tension by its flaring form, causing the line to crowd hard upon the angle $b$. The object of the blunt angle $c$ is also to allow the line, if too small, to pass into the next notch, and for that reason is rounded or convex on its face, thus obviating a very sharp point where it unites with angle $b$, to form a second notch. The form of the outside of the pin is to give each notch the same tension, as near as possible, by having the most flexible part of the prongs as near to the notches as possible.

By the above-described construction, the clothes-pin is adapted to different size lines, and to the thickness of the material desired to be secured upon the clothes-line.

What I claim as my invention is—

1. A clothes-pin provided with a series of notches on the inside of the prongs, for the reception of different size clothes-lines, substantially as herein shown and described.

2. The within-described clothes-pin, provided with a series of beveled notches on the inside of the prongs, having the sharp angle $b$, and blunt angle $c$, substantially as and for the purpose specified.

ALBERT G. CUMMINGS.

Witnesses:
 ALBERT PORT, Jr.,
 J. H. BATES.